April 5, 1949.  A. M. CHAMBERS, JR  2,466,533
OIL SEAL
Filed April 8, 1947
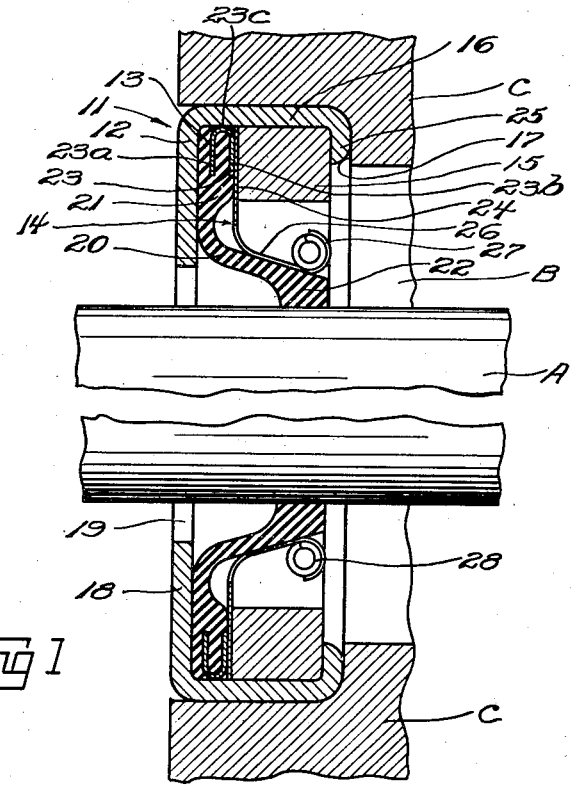
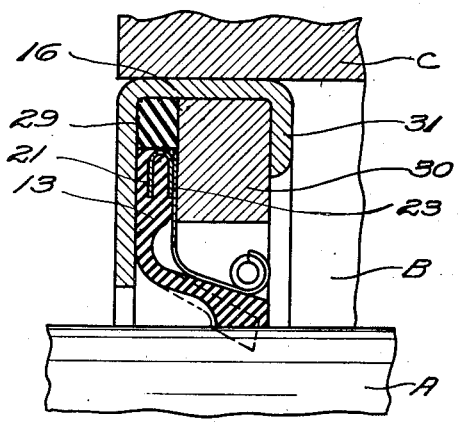
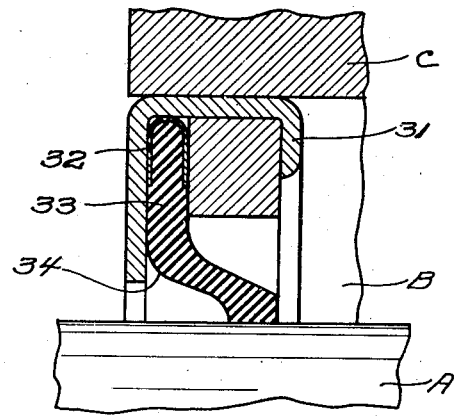
INVENTOR
ALBERT M. CHAMBERS JR.
BY
Fraser, Myers & Manley
ATTORNEYS Patented Apr. 5, 1949

2,466,533

UNITED STATES PATENT OFFICE 2,466,533

OIL SEAL

Albert M. Chambers, Jr., Palmyra, N. Y., assignor to The Garlock Packing Company, Palmyra, N. Y., a corporation of New York Application April 8, 1947, Serial No. 740,104

6 Claims. (Cl. 286—5)

The present invention relates to improvements in oil seals for preventing the passage of oil or other fluids or of dust or other foreign matter along an annular space between a pair of machine elements which are movable relatively to each other such as, for example, a rotatable shaft and a housing in which the shaft is mounted; and to improvements in manufacturing such oil seals. The invention, although useful with respect to such seals of various over-all diameters, nevertheless is particularly useful with reference to seals provided for use with machine elements of relatively substantial diameter.

Oil seals ordinarily comprise a rigid base or mounting portion and for many purposes it has been found satisfactory to provide such a base in the form of an annular metal shell which may be press-fitted into an annular opening in a machine element such as a machine casing. The metal shell has a central aperture through which extends an inner machine element such as a rotatable shaft. To prevent oil or dust, etc. from passing along the shaft, a flexible annular sealing element is fixedly seated within the shell in such a way that the outer periphery and usually also a side wall of the sealing element effects a seal with the inside of the shell. The sealing element ordinarily has an axially extending sealing flange which engages and effects a running seal with the exterior of the shaft. Spring means often are provided to urge the sealing flange into firm sealing engagement with the shaft while in some oil seals the inherent resiliency of the sealing element suffices for that purpose.

In relatively small oil seals for use with shafts of, say, 8" diameter or less, a sealing ring of relatively soft resilient material may be mounted between a radial flange at one end of the metal shell and a swaged-in portion of the other end of the metal shell. Because of the small diameter of the parts, the sealing ring, despite its softness, has an inherent tendency to retain its annular shape and, hence, would not collapse inwardly and become displaced from within the shell.

However, in oil seals for use with thicker shafts, as the diameters increase it becomes progressively more difficult to assure that the soft sealing ring will be firmly held in place in the shell. The larger soft sealing rings in such larger oil seals have little or no inherent tendency to retain their normal annular shape; therefore it should be obvious that if such a larger, soft sealing ring were clamped within the metal shell between a radial flange at one axial end of the shell and a swaged-in portion at the opposite axial end of the shell, the sealing ring would tend to flow inwardly and would be distorted beyond usefulness and/or become completely displaced from within the shell.

Also, some difficulty has been encountered in manufacturing oil seals of large overall diameter for it is very difficult indeed to make precise allowances for the shrinkage that will occur in a sealing ring during or immediately subsequent to the molding operation in which it is formed. Under some processing conditions the shrinkage with respect to a given size of sealing ring is greater than under other conditions and the uniformity of such conditions cannot be precisely controlled. The shrinkage differences in small diameter sealing rings are practically imperceptible and of no material effect upon the finished oil seal; but the shrinkage differences in large sealing rings are substantial and may materially impair the uniformity of the finished oil seals and their effectiveness in service. Thus, in manufacturing any given size of large diameter oil seal prior to the present invention, there was no certainty that all sealing rings made for assembly into such seals would be of the intended diameter which would enable them to fit snugly within the metal shells.

An important object of the present invention is to provide an oil seal in which the sealing ring thereof will be positively and firmly held in place.

Another important object of the invention is the provision of an oil seal, which may be of large diameter, in which the sealing ring will be of the proper over-all diameter so that when assembled in the oil seal it will form a snug fit and an effective seal with the metal shell in which it is mounted.

Another important object of the invention is the provision of a sealing ring which, although of large over-all diameter, is sufficiently rigid to be handled without becoming mis-shapen and which has an initial substantially true circular shape without material waves or other irregularities therein.

Another important object is the provision of a method of manufacturing relatively large-diameter oil seals to derive substantial uniformity and precision in the sizes of the component parts of a number of such seals manufactured.

The foregoing and other important objects and advantages of the present invention should be apparent from the following specification and the accompanying drawings which, for illustrative purposes, describe and illustrate several embodiments of this invention. In the drawings—

Figure 1 is a substantially central axial, sectional view of an oil seal according to a preferred embodiment of the present invention, the device being shown associated with portions of a housing and a shaft of a machine.

Figs. 2 and 3 are views somewhat similar to the upper portion of Fig. 1 showing modified forms of the present invention.

In Fig. 1 a shaft A is shown extending through an opening B in a wall or other casing portion C of the machine. In order to prevent the passage of oil or other fluid along the shaft in one direction, say from right to left, as viewed in the drawing, and to prevent the passage of dust or other foreign matter in the opposite direction along the shaft, there is provided a sealing device 11 comprising a rigid annular cup-shaped metal shell 12, within which are clamped a resilient annular sealing element 13, an annular spring carrier 14 and a filter ring 15 preferably of suitable metal.

The metal shell 12 has a cylindrical flange 16 which fits with a tight press-fit within the bore defining the opening B or within a shouldered counterbore 17 in the casing C. The metal shell 12 also has a radial flange 18 which extends radially inwardly from the outer end of the cylindrical flange 16 and terminates at an inner periphery defining an aperture 19 through which the shaft A extends.

The sealing element 13 comprises a resilient portion 20, preferably of rubber, synthetic rubber or other rubber-like material, having a radial flange 21 and, extending axially inwardly from the inner part of the flange 21 is a sealing flange 22, the inner periphery of which is adapted to engage the shaft A and form a running seal therewith. The sealing element 13 also includes a supporting ring 23 preferably of channel-shaped metal to which the radial flange 21 of the sealing element is firmly fixed peripherally in a suitable manner. As shown in the drawing, the concave side of the supporting ring 23 faces inwardly; its left flange 23a extends radially into the material of the said flange 21, its right flange 23b extends over and preferably is embedded in the right face of the flange 21, and its flange-connecting portion 23c is of the precise outer diameter desired for the sealing element 13, and its outer periphery corresponds to the outer periphery of the radial flange 21 of the sealing element. The resilient portion 20 and the supporting ring 23 preferably are bonded together by vulcanization as hereinafter explained.

The spring carrier 14 preferably is formed of flat, somewhat pliant or resilient metal and has a radial flange 24 constituting an outer marginal portion which is disposed between the filler ring 15 and the radial flange 21 of the sealing element.

The spring carrier 14 also has a plurality of axially extending fingers 26 integral with the flange 24. These fingers are bent outwardly and back upon themselves to some extent to form hooks 27 which hold in place a coil garter-spring 28 suitably tensioned to normally urge the sealing flange 22 inwardly and thereby enhance the sealing effect between the latter flange and the shaft A.

The metal of which the spring carrier 14 is formed may either be resilient so that it may have some spring effect either to augment or oppose the effect of the garter-spring 28, or the metal of which the spring carrier is formed may merely be somewhat pliant so that the spring-carrier merely serves as a means of holding the garter-spring 28 against accidental dislodgment from the assembly and as a buffer between the garter-spring and the sealing flange 22 to prevent the said spring from becoming imbedded in said flange and thus becoming subjected to some snubbing effect. The spring-carrier 14 is shown in the present drawings merely in cross-section, elevational detail thereof being omitted herein because the spring-carrier is not an essential part of the present invention. Such spring-carriers, however, have been disclosed and claimed in my co-pending applications, Serial No. 577,113, filed February 9, 1945, now Patent No. 2,434,484, and Serial No. 600,283, filed June 19, 1945, now Patent No. 2,434,485.

When the radial flange 21 of the sealing element, the radial flange 24 of the spring-carrier and the filler ring 15 are assembled within the shell 12, the inner marginal portion of the cylindrical flange 16 of said shell is swaged inwardly as at 25 to hold the said sealing element, spring-carrier and filler ring firmly together in a substantially compressed or clamped condition.

It may be seen that if the relatively soft sealing element 13 did not have the supporting ring 23, the rubber or rubber-like material of the radial flange 21 of the sealing element would tend to flow radially inwardly under the mentioned compression resulting from the swaging of the shell, thereby somewhat deforming the remainder of the sealing ring and preventing it from functioning efficiently in the manner intended. Also, without the supporting ring 23 the sealing ring 13, particularly in a seal of large over-all diameter, would have a strong tendency to flow inwardly to such an extent as to become displaced from within the shell. The supporting ring 23 effectively prevents such distortion or displacement of the sealing element.

According to the present invention, the metal supporting ring 23 is made separately and can be so processed that when finished, it will be of the precise over-all diameter intended. Then, the supporting ring is placed in proper juxtaposition to an uncured blank of rubber or rubber-like material within one or more mold members designed to correspond to the contour of a finished sealing element 13. Under suitable heat and pressure, the mold is closed for a suitable duration of time to substantially form the sealing element in its final shape. The diameter of the supporting ring 23 is not materially altered in the molding of the sealing element and as the resilient portion 20 of the sealing element is firmly bonded and vulcanized to the supporting ring 23, the flange 21 of the sealing element of course will not undergo any material shrinkage. Thus by this means it is assured that sealing elements such as ring 13 will always be of the intended over-all diameter and will fit snugly with an oil-tight fit within the metal shells 12 for which they are designed. Even if some shrinkage of a portion of the said radial flange 21 were to occur in the described curing or vulcanizing operation, it would not affect the over-all diameter of the sealing element 13 for the outer periphery of the latter would still be defined by the outer periphery of the supporting ring 23. Obviously, if a metal supporting ring is incorporated into the sealing element in the manner described herein there could not be any material inward flow of the radial flange 21 as a result of the clamping of the latter within the shell, hence the sealing element could not become materially distorted or unintentionally displaced from its proper position within the shell.

The embodiment illustrated in Fig. 2 differs from that of Fig. 1 principally in that the outer diameter of the sealing element 13 is less than the inner diameter of the cylindrical flange 16 of the metal shell; and a filler ring 29 is employed to take up the radial space between the two whereby to properly center the sealing element. The filler ring 29 preferably should be of a composition such as rubber, synthetic rubber or other rubber-like material and preferably should have such characteristics that it would react quite the same as the radial flange 21 of the sealing element when the two are subjected to the axial compression under which the filler ring 30 is held thereagainst by the swaged-in radial flange 31 of the metal shell. By this arrangement a single size of sealing element 13 may be suitable for use in a limited variety of sizes of metal shells, the latter of course being of whatever size is necessary to fit within a given opening B. Thus, if the metal shell required to meet certain machine specifications were substantially larger in diameter than the over-all diameter of the sealing element, then the filler ring 29 would be of relatively substantial radial, sectional diameter. On the other hand, if the difference between the over-all diameter of the sealing element and the inner diameter of the cylindrical flange 16 were relatively small, the radial sectional diameter of the filler ring 29 likewise would be relatively small. In any event, the filler ring 29 would radially complement the sealing ring 13 to assure a firm fit of the two within the cylindrical flange 16.

In the embodiment shown in Fig. 3, the axial diameter of the supporting ring 32 is substantially the same as the axial diameter of the radial flange 33 of the sealing ring 34, the said supporting ring, instead of having a part completely imbedded within the sealing element as in the previously described embodiments, being imbedded only in the opposed outer radial faces of the sealing element. A sealing element 34 such as shown in Fig. 3 could, of course, be employed in assemblies of the general characters shown in Figs. 1 and 2 and, likewise, a sealing element 13 such as shown in Figs. 1 and 2 could be employed in the structure of Fig. 3. The structure shown in Fig. 3 does not include any spring or spring holder or equivalent means because under some conditions the inherent resiliency of the sealing element 34 would be sufficient to maintain adequate sealing contact of the sealing flange of said ring with the shaft. If desired, however, any suitable means, either as shown in the other illustrated embodiments or of any other suitable character, might be employed within the present invention to urge the sealing flange of the sealing element into firm sealing engagement with the shaft.

In the several embodiments illustrated and described herein it will be observed that if the operation of swaging-in the metal shell as at 25 (Fig. 1) and 31 (Figs. 2 and 3) is done in such a manner as to exert a very substantial axially applied compressive force upon the sealing element and the filler ring adjacent to said swaged-in portions, the flanges of the supporting ring will have a tendency to be urged together under the mentioned compressive force. This will have the effect of clamping the resilient portion of the sealing element within the supporting ring and thus serve to even more securely integrate the two.

From the foregoing it will be seen that the present invention, as disclosed herein, achieves all the stated objects in a simple and effective manner. Obviously the present inventive concept could be employed in numerous ways other than those illustrated and described herein, and therefore the present invention is not to be limited to the precise structures disclosed and described herein, but is to be considered as of a scope limited only as indicated in the following claims.

What I claim is:

1. An oil seal for sealing an annular space between relatively rotatable outer and inner machine elements, comprising a sealing element having a sealing ring of relatively soft, flexible, molded material with a sealing portion for effecting a running seal with the inner machine element and an integral radially extending mounting flange, and a supporting ring of relatively thin resilient metal, substantially U-shaped in cross-section, disposed with the concave part of the U facing radially inwardly and substantially completely occupied by and adherently bonded to the material of said mounting flange, a rigid shell having a cylindrical portion adapted for press-fitting into the outer machine element and a flange extending radially inwardly at one side of said mounting flange at least to the extent of the radially inward extension of said supporting ring, and clamping means having an annular radial surface at the other side of said mounting flange and extending radially at least over an area corresponding to the radial area between the outer and the inner peripheries of said supporting ring, the said clamping means and said radial flange of the shell coacting to compress the said mounting flange axially therebetween to hold the sealing element in place within the shell, and the U arms of the said supporting ring being of greater radial dimension than the spacing between said arms and being bendable toward each other by such axial clamping compression to supplement the bond between the supporting ring and the sealing ring to prevent material radially inward displacement of the radial flange of the sealing ring.

2. An oil seal according to claim 1, further characterized in that one arm of the U of the supporting ring is partially embedded in one side face of the mounting flange of the flexible sealing ring and the other arm of the U is embedded within the said mounting flange.

3. An oil seal according to claim 1, further characterized in that one arm of the U of the supporting ring is partially embedded in one side face of the mounting flange of the flexible sealing ring and the other arm of the U is embedded within the said mounting flange, the other side face of the latter being in sealing contact with a face of the shell's radial flange.

4. An oil seal according to claim 1, further characterized in that the outer radial diameter of the sealing element is substantially less than the inside radial diameter of the shell's cylindrical portion, a filler ring being provided to fill the radial space between the said cylindrical portion and the said sealing element.

5. An oil seal according to claim 1, further characterized in that the outer radial diameter of the sealing element is substantially less than the inside radial diameter of the shell's cylindrical portion, a filler ring being provided to fill the radial space between the said cylindrical portion and the said sealing element, the said filler ring being of substantially the same capacity as the said sealing element for resisting the axially applied clamping force.

6. An oil seal according to claim 1, further characterized in that the opposite arms of the U of the supporting ring are fixed to opposite side faces of the mounting flange of the flexible sealing ring.

ALBERT M. CHAMBERS, Jr.

REFERENCES CITED

The following references are of record in the file of this patent:

UNITED STATES PATENTS

| Number | Name | Date |
| --- | --- | --- |
| Re. 8,132 | Collender | Mar. 19, 1878 |
| 1,254,646 | Bausch | Jan. 29, 1918 |
| 1,817,238 | Cremean | Aug. 4, 1931 |
| 2,040,379 | Heinze | May 12, 1936 |
| 2,116,240 | Heinze | May 3, 1938 |
| 2,146,677 | Johnson | Feb. 7, 1939 |
| 2,227,771 | Victor et al. | Jan. 7, 1941 |
| 2,264,148 | Fisher et al. | Nov. 25, 1941 |
| 2,365,048 | Bruno | Dec. 12, 1944 |